No. 844,421. PATENTED FEB. 19, 1907.
B. E. D. STAFFORD.
FLEXIBLE STAY BOLT.
APPLICATION FILED MAY 16, 1905.
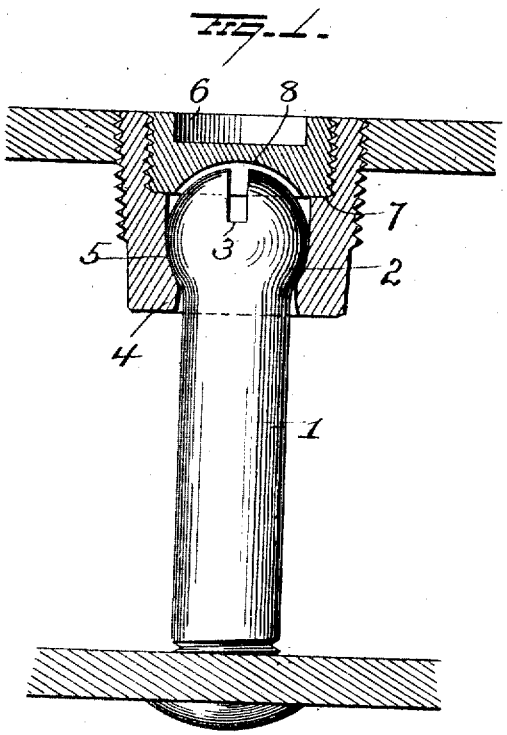
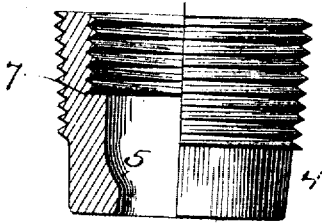
WITNESSES
INVENTOR
B. E. D. Stafford
By H. A. Seymour
Attorney

UNITED STATES PATENT OFFICE.

BENJAMIN E. D. STAFFORD, OF PITTSBURG, PENNSYLVANIA.

FLEXIBLE STAY-BOLT.

No. 844,421.

Specification of Letters Patent.

Patented Feb. 19, 1907.

Application filed May 16, 1905. Serial No. 260,713.

*To all whom it may concern:*

Be it known that I, BENJAMIN E. D. STAFFORD, of Pittsburg, in the county of Allegheny and State of Pennsylvania, have invented certain new and useful Improvements in Flexible Stay-Bolts; and I do hereby declare the following to be a full, clear, and exact description of the invention, such as will enable others skilled in the art to which it appertains to make and use the same.

My invention relates to an improvement in flexible stay-bolts for boilers, the object being to provide a stay-bolt that can be inserted from the outside and when in place will form absolutely tight joints, thus preventing any leakage, and which will be flush or practically flush with the outer face of the boiler-sheet or other part, thus permitting it to be used in positions where bolts with heads mounted in a bushing or plug which project beyond the sheet cannot be used.

With these ends in view my invention consists in the parts and combinations of parts, as will be more fully described, and pointed out in the claim.

In the accompanying drawings, Figure 1 is a view partly in section, illustrating my improvement in connection with the inner and outer sheets of the boiler. Fig. 2 is an end view of the bolt-head; and Fig. 3 is an elevation, partly in section, of the threaded bushing.

In constructing a stay-bolt in accordance with my invention I provide a bolt 1, having a substantially spherical head 2 at one end and a threaded portion at the other end, the head 2 being provided with a slot 3 for the engagement of a suitable driver.

Secured within the outer shell of the boiler is the bushing 4. This bushing is made slightly tapering and is screw-threaded externally, so that as it is screwed into the outer plate or shell the wedging produces an absolutely tight joint. The inner end of this bushing has an opening of greater diameter than the diameter of the body of the bolt 1 and is slightly flaring, so as to permit of a free lateral movement of the bolts within reasonable limits. This bushing is designed to receive the head 2 of the bolt 1 and is provided internally near its inner end with a seat 5, formed, preferably, in the arc of a circle for the spherical head 2 of the bolt 1, thus permitting of movement of the head on the seat during the expansion and contraction of the plates to which the bolts are connected.

The portion of the cavity occupied by the head 2 of the bolt 1 is plain, while the outer end of the bushing is provided with internal threads to engage the threads on the screw-cap 6, which latter is designed to close the outer end of the bushing. This cap 6 when seated in the bushing rests against the annular shoulder 7, which latter limits the inward penetration of the cap and prevents the latter from being screwed into contact with the head. The inner face of the cap 6 is, however, made dished or concaved, as at 8, so as to provide ample clearance-space for the head of the bolt and permit of its free unrestricted pivotal movements during the lateral movements of the bolt due to the expansion and contraction of the sheets to which the bolts are applied.

With my improvement the bushing can be screwed in flush with the outer face of the outer sheet or plate of the boiler, and thus permit of its use in place where a projecting bushing could not be used. Again, the bushing constructed and secured in place, combined with the spherical head of the bolt, and the screw-cap fitting within the bushing and resting on an annular seat form, when properly secured in place, a water and steam tight joint, and by shaping the bolt-head, bushing, and cap as above explained the bolt is free to move pivotally on its head to compensate for any and all variations in the relative positions of the parts connected by said bolts due to unequal expansion and contraction of said parts.

In applying my bolt the bushing is first inserted in the outer sheets and screwed home or until its outer face is approximately flush with the outer face of the sheet. The bolt is then passed through the bushing and screwed into the inner sheet or plate until the head of the bolt bears solidly on its seat in the bushing, after which the bushing is closed by the cap.

It is evident that many slight changes might be resorted to in the relative arrangement of parts herein shown and described without departing from the spirit and scope of my invention. Hence I would have it understood that I do not wish to confine myself to the exact construction herein shown and described; but, Having fully described my invention, what

I claim as new, and desire to secure by Letters Patent, is—

A stay-bolt structure comprising a bolt having a head which is substantially spherical in form, a bushing having an opening for the passage of the bolt and a curved seat for that portion of the spherical head adjacent to the body of the bolt, said bushing having an enlarged opening in its upper portion terminating in an annular shoulder, the wall of said opening being threaded, and a cap screwed into said enlarged opening and bearing against said annular shoulder, the inner face of said cap being curved substantially concentric to and spaced from the outer spherical portion of the head and the outer end of said cap adapted to lie flush with the outer end of the bushing.

In testimony whereof I have signed this specification in the presence of two subscribing witnesses.

BENJAMIN E. D. STAFFORD.

Witnesses:
 A. W. BRIGHT,
 S. G. NOTTINGHAM.